(12) United States Patent
Sakamoto

(10) Patent No.: US 7,570,883 B2
(45) Date of Patent: Aug. 4, 2009

(54) IMAGE PICKUP METHOD AND APPARATUS WITH ISO SENSITIVITY SETTING VARIABLE

(75) Inventor: Koichi Sakamoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 309 days.

(21) Appl. No.: 11/723,695

(22) Filed: Mar. 21, 2007

(65) Prior Publication Data
US 2007/0223908 A1     Sep. 27, 2007

(30) Foreign Application Priority Data
Mar. 24, 2006  (JP)  ............... 2006-082958

(51) Int. Cl.
G03B 7/08 (2006.01)
H04N 5/235 (2006.01)
(52) U.S. Cl. ............... 396/234; 396/48; 396/210; 396/213; 348/229.1
(58) Field of Classification Search ............ 396/48, 396/210, 213–262; 348/216.1, 217.1, 221.1, 348/229.1, 230.1; 356/221, 222, 224
See application file for complete search history.

(56) References Cited
U.S. PATENT DOCUMENTS

| | | | | |
|---|---|---|---|---|
| 4,445,778 A | * | 5/1984 | Nakauchi | ............... 356/222 |
| 5,272,539 A | * | 12/1993 | Kondo | ............... 348/229.1 |
| 5,339,163 A | * | 8/1994 | Homma et al. | ............... 348/229.1 |
| 5,461,452 A | * | 10/1995 | Iwasaki | ............... 396/51 |
| 7,415,203 B2 | * | 8/2008 | Lee | ............... 396/233 |
| 2007/0242944 A1 | * | 10/2007 | Mizusawa | ............... 396/234 |

FOREIGN PATENT DOCUMENTS

JP  2005-184508 A  7/2005

\* cited by examiner

*Primary Examiner*—W. B. Perkey
*Assistant Examiner*—Bret Adams
(74) *Attorney, Agent, or Firm*—Birch, Stewart, Kolasch & Birch, LLP

(57) ABSTRACT

An image pickup apparatus includes an automatic exposure controller automatically controls ISO sensitivity in response to the output signal of an exposure metering circuit, and controls the exposure so that exposure setting is determined based on the brightness values of both the central photometry area and the remaining photometry area of an imaging frame. The automatic exposure controller controls the exposure setting so that when the ISO sensitivity is set to its higher value, the weighting factor of the central photometry area is higher than that of the remaining photometry area. The automatic exposure controller further determines whether or not a light source is behind an object, and, if it is the case, reduces the adjusted exposure setting so as to increase the amount of light incident on the image pickup apparatus.

7 Claims, 4 Drawing Sheets

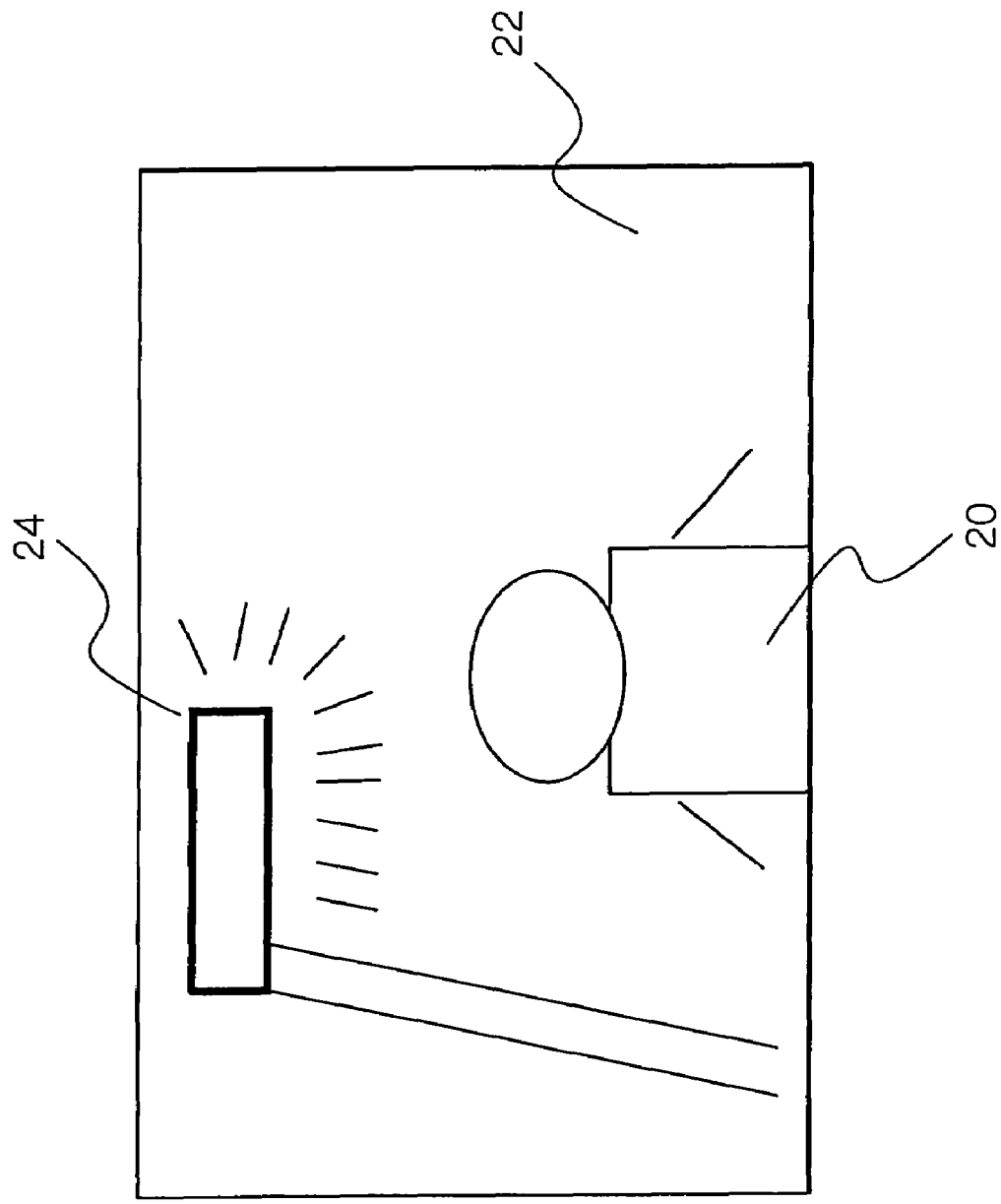

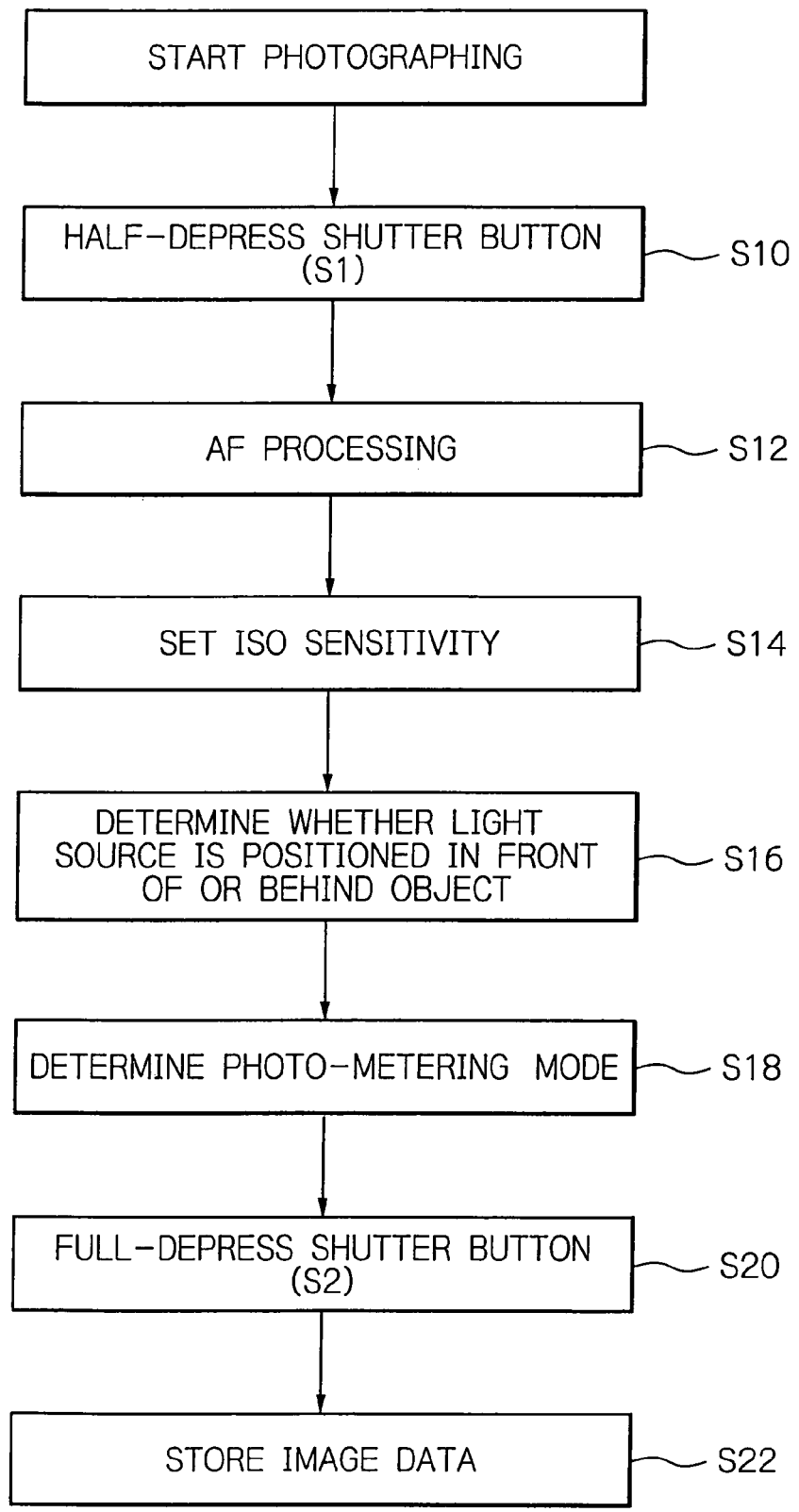

FIG. 4A

| 0.5 | 1 | 1 | 0.5 |
|---|---|---|---|
| 1 | 1.5 | 1.5 | 1 |
| 1 | 1.5 | 1.5 | 1 |
| 0.5 | 1 | 1 | 0.5 |

FIG. 4B

| 0.5 | 0.5 | 0.5 | 0.5 |
|---|---|---|---|
| 0.5 | 2.5 | 2.5 | 0.5 |
| 0.5 | 2.5 | 2.5 | 0.5 |
| 0.5 | 0.5 | 0.5 | 0.5 |

FIG. 4C

| 0.0 | 0.0 | 0.0 | 0.0 |
|---|---|---|---|
| 0.0 | 4 | 4 | 0.0 |
| 0.0 | 4 | 4 | 0.0 |
| 0.0 | 0.0 | 0.0 | 0.0 |

IMAGE PICKUP METHOD AND APPARATUS WITH ISO SENSITIVITY SETTING VARIABLE

BACKGROUND OF THE INVENTION

1. Field of the Invention

The present invention relates to an image pickup apparatus and a method therefor. In particular, the invention relates to an image pickup apparatus and a method therefor suitable for use in a camera with variable ISO (International Organization for Standardization) sensitivity setting and applicable to an electronic still camera device, image input device, movie camera, mobile phone, etc.

2. Description of the Background Art

Conventionally, an imaging apparatus such as an electronic camera is configured to shoot with a built-in slave and flash unit under a dark condition or to accommodate an external flash unit detachably mounted on the hot shoe of the camera, thereby allowing the camera to clearly capture shots even under a dark condition, e.g., at night. For example, Japanese patent laid-open publication No. 2005-184508 discloses a method for pre-flashing before main flashing, when taking a photograph of a person standing with his or her back to the sky at night, to radiate the light toward his or her face to be shot and detect the face so as to determine the area of the object in a picture to be shot, thereby better controlling the flashing.

Further, another method has also been employed for allowing a photographer to adjust the ISO sensitivity or speed setting on a camera to the state of so-called "ISO Auto" in which the ISO sensitivity is automatically adjusted in response to the output signal of the photo-metering circuit or to manually set the ISO sensitivity to its higher level in order to be able to photograph under a dark lighting condition. When the subject of principal interest in the central portion of a scene to be photographed is relatively darker, the ISO sensitivity is set to its higher level.

In some cases, if the ISO sensitivity setting is switched to "ISO Auto", allowing a photographer to take a photograph of a subject such as a person standing with his or her back to the sky at night, the exposure control is interfered by a brighter object such as a street lamp so that the photograph of the subject will be underexposed. This is because the photograph is taken almost against the light causing the image of the subject to become dark.

SUMMARY OF THE INVENTION

It is an object of the invention to provide an image pickup apparatus and a method therefor for preventing a subject such as a person from being photographed with inappropriate exposure such as underexposure even with the ISO sensitivity changeable.

In accordance with the present invention, an image pickup apparatus with ISO (International Organization for Standardization) sensitivity setting variable comprises: a sensitivity setter for setting an ISO sensitivity; and an exposure controller for performing exposure control so that the exposure is determined based on the brightness values of a first photometry area and a second photometry area different from the first photometry area of a photographing frame. The weighting factors of the first photometry area and the second photometry area are variable during the exposure control, and the exposure controller controls the exposure so that the weighting factors of the first photometry area and the second photometry area are varied according to the ISO sensitivity set by the sensitivity setter.

The image pickup apparatus of the invention is configured so that when ISO sensitivity setting is set to "ISO Auto" based on scene brightness, allowing a photographer to take a photograph of an object, the exposure is controlled so that the exposure is switched between one photo-metering mode, for example, a divisional average metering mode, in which the first and second photometry sub-areas are weighted approximately equally to each other, and another photo-metering mode, for example, a center-weighted metering mode, in which the first photometry area is more heavily weighted than the other, depending on the sensitivity, i.e., the degree of darkness of an scene to be photographed.

In this way, for example, when an object is positioned at the center of a photographing frame, exposure control is accomplished by the center-weighted metering mode in which the object is more heavily weighted than the periphery of the photographing frame and therefore, and therefore a photographer can shoot the object with an optimal exposure value even when the object is against the light. For example, if an image of a human subject is taken at night, such a situation can be prevented that the exposure control is affected by a brighter object such as a street lamp to the extent that the subject is underexposed. Incidentally, the ISO sensitivity refers to a reference value corresponding to a combination of the F value of an imaging lens system with a shutter speed for attaining an exposure appropriate for a photo-metered value of brightness of an object to be imaged.

Note that sensitivity setting means for setting an ISO sensitivity may be of the type in which the user uses an input device to select an ISO sensitivity, on the basis of which the image pickup apparatus sets the sensitivity, or the image pickup apparatus automatically selects the optimum ISO sensitivity with the brightness of an object taken into account.

According to the invention, the first photometry area may be the central portion of a photographing frame. In this case, the weighting factor of an area at the center of the photographing frame in a center-weighted photo-metering mode can be adjusted so as to mate with the ISO sensitivity. Further, the first photometry area could be an area including at least a portion of a particular object, for example, the face of a person to be imaged. In this case, the ISO sensitivity can be adjusted according to the brightness of the face.

Further, it may be contemplated that the exposure controller operates so that the first photometry area is weighted more heavily than the second photometry area as the ISO sensitivity set by the sensitivity setter gets higher. More specifically, as the ISO sensitivity gets higher, i.e., it becomes darker, the weighting of sub-areas of the photographing frame may be controlled so as to shift itself from a divisional average photo-metering mode to a center-weighted photo-metering mode. In this way, the exposure is controlled so that the brightness of an object positioned at the central region of a photographing frame is mainly measured.

In the image pickup apparatus of the invention, the exposure controller may be adapted for determining whether or not a light source is positioned behind an object, and if it is the case, changes the exposure value accordingly. This establishes more accurate exposure control. Further, each of the first and second photometry areas may be single, or at least one of the first and the second photometry areas includes a plurality of photometry sub-areas.

Further in accordance with the present invention, an image pickup method of setting an ISO sensitivity variable comprises the steps of: setting an ISO sensitivity; performing exposure control so that the exposure is determined based on the brightness values of a first photometry area and a second photometry area different from the first photometry area of a photographing frame; and controlling the weighting factors of the first photometry area and the second photometry area to be variable during the exposure control so that the weighting factors of the first photometry area and the second photometry area are varied according to the ISO sensitivity set by the sensitivity setter.

In accordance with the present invention, even when a subject such as a person is photographed with the ISO sensitivity changed, a photographer is able to prevent the subject from being photographed with inappropriate exposure, for example, from being underexposed.

BRIEF DESCRIPTION OF THE DRAWINGS

The objects and features of the present invention will become more apparent from consideration of the following detailed description taken in conjunction with the accompanying drawings in which:

FIG. 2 is a view for use in understanding how a scene is photographed in accordance with the embodiment shown in FIG. 1;

FIG. 3 is a flowchart useful for understanding the operation of the digital still camera shown in FIG. 1; and FIGS. 4A, 4B and 4C are diagrams for use in describing how weighting is performed in accordance with a modification of the illustrative embodiment.

DESCRIPTION OF THE PREFERRED EMBODIMENT

Figure 1:
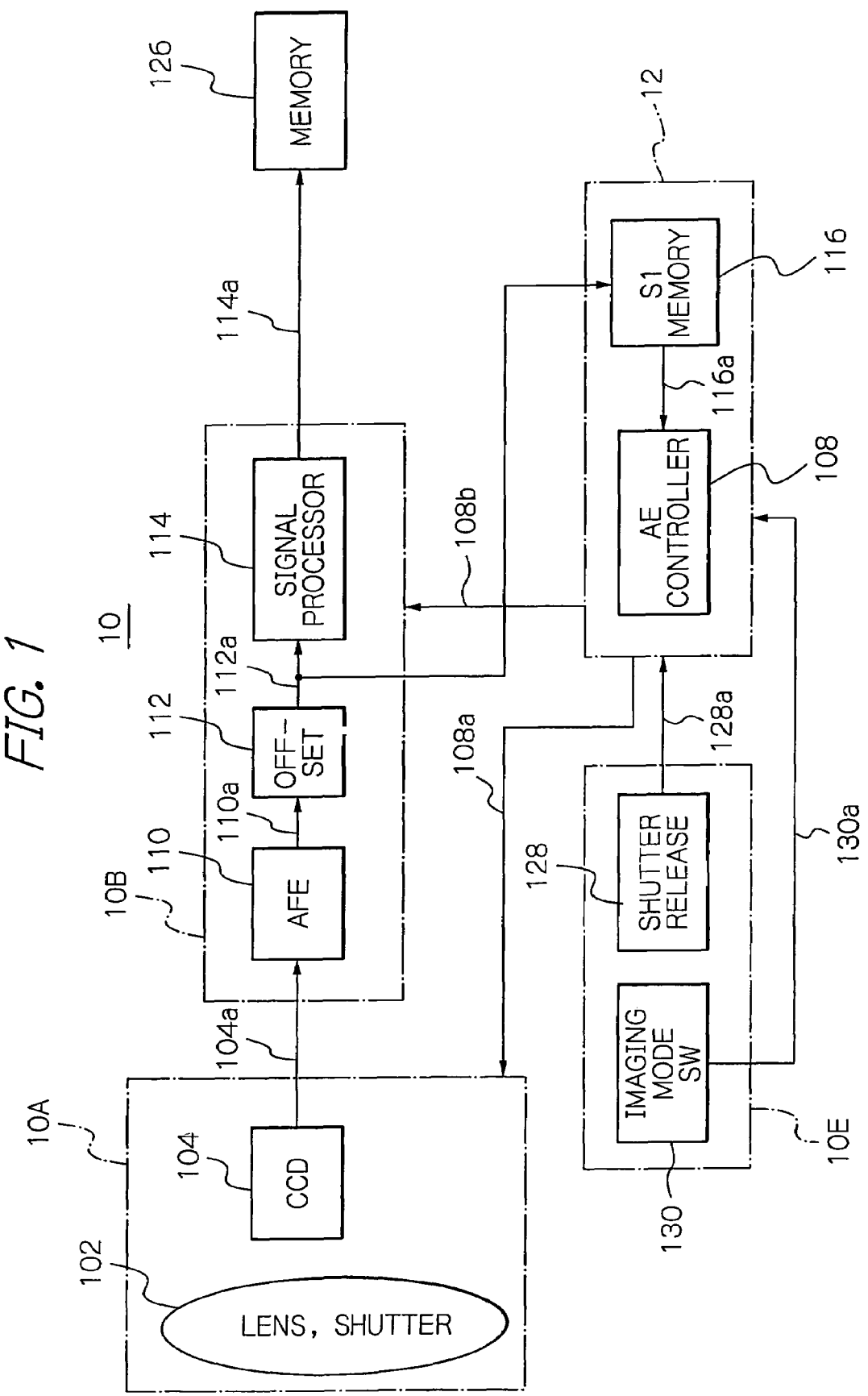
FIG. 1 is a schematic block diagram showing the general configuration of an illustrative embodiment of an electronic digital still camera including a solid-state image pickup apparatus according to the invention.

Embodiments of a solid state image pickup apparatus and image pickup method according to the invention will be described in detail below with reference to the accompanying drawings.

The solid state image pickup apparatus of the illustrative embodiment is implemented as an electronic digital still camera 10, which includes an AE (Automatic Exposure) controller 108 which automatically controls the ISO (International Organization for Standardization) optical sensitivity or speed in response to the output signal of a photo-metering circuit, not shown, and is responsive to the brightness values of both the central photometry area of an imaging or photographing frame being captured and the remaining photometry area other than the central region to determine exposure setting, thereby controlling the exposure with allotting different weighting factors to the photometry area between the central and remaining photometry areas. More particularly, the automatic exposure controller 108 controls the exposure setting so that when the ISO sensitivity is set to its higher value, the weighting factor of the central photometry area is higher than that of the photometry area other than the central. The automatic exposure controller 108 further determines whether or not a light source is behind an object to be shot, and if it is the case, then it reduces the adjusted exposure setting in order to increase the amount of light incident on the camera 10.

Note that the central photometry area can be of including a specific object, e.g., part of the face of a person. In such a case, the proper exposure setting is determined based on the brightness of a face and the ISO sensitivity. Accordingly, even when a target object to be photographed is located displaced from the central area of the imaging frame, i.e. object field to be captured, the object can be photographed with proper exposure. A face may be detected in a known manner on the basis of an image signal representing a captured image. Thus, it may be contemplated that an area including part or all of the detected face is defined as the central photometry area.

In this illustrative embodiment, divisional photo-metering (referred also to as multiple photo-metering) and center-weighted photo-metering are employed. In the embodiment, when ISO sensitivity is set higher, the photo-metering aspect of the camera is changed over from a multiple photo-metering mode to a center-weighted photo-metering mode.

In addition to the above-stated two photo-metering modes, a partial photo-metering, a spot photo-metering, an average photo-metering mode, etc., are available. However, the invention is not limited to a method for changing the photo-metering mode from the multiple photo-metering mode to the center-weighted photo-metering mode, but may be applied to a system including a combination of metering modes other than those employed in this embodiment, as long as the system operates to first measure the brightness of areas other than the central area of an imaging frame and then measure the brightness of the central area of the imaging frame or the brightness of a target object. For example, the invention may be applied to a system for changing the photo-metering mode from a multiple photo-metering mode to a partial or spot photo-metering mode.

When the photo-metering mode is set to the multiple photo-metering mode, an imaging or photographing frame is divided into 36 (6×6) sub-areas, the brightness of these sub-areas is measured to provide information on the measured brightness, and the optimal exposure is calculated by assigning weighting factors of these sub-areas different, based on the information on the brightness while taking into account the brightness of all sub-areas in the photographing frame, etc. Thus, advantageously, a proper exposure is assured for a target object to be taken, by taking into account the brightness of the entire frame, and the brightness of the target object can be accurately measured even when the object is located displaced from the central area of an image frame. In case of the multiple photo-metering mode, rather than the position of an object in a photographing frame, the brightness of all sub-areas in the photographing frame is taken into account to determine optimum exposure. In a method for calculation of the optimum exposure, for example, when the contrast in brightness of a scene increases, average photo-metering is performed so that measurement of the brightness of all sub-areas in a photographing frame is averaged, whereas, when the brightness contrast of a scene decreases, center-weighted photo-metering is performed so that higher weighting factors are assigned to the sub-areas in the central area of photographing frame.

In the center-weighted photo-metering mode, the ratio of weighting factors between the central area of a photographing frame, e.g., about 15% of the entire area of the photographing frame and the surrounding area of the photographing frame may be set to, e.g., 2:1, to calculate the optimum exposure accordingly. Even when an object staying in the central area of a photographing frame is significantly brighter than the darker surroundings of the object, or vice versa, the center-weighted photo-metering allows the camera to take shots of the entire scene to ensure the optimum exposure.

Note that in the spot photo-metering mode, the brightness of a small sub-area in the central area of photographing frame, e.g., the brightness of only three percent of the sub-area in the central area of photographing frame is measured to determine the optimum exposure. This mode is effectively used, e.g., when a photographer wants to emphasize an object illuminated with spot light in the photograph. In the partial photo-metering mode, the brightness of an area is measured, which is larger than in the case of the spot photo-metering mode and positioned in the central area of photographing frame, to determine the optimum exposure. In the average photo-metering mode, measurements of brightness obtained from all sub-areas in the photographing frame is averaged.

How to apply an image pickup apparatus of the embodiment to the digital still camera 10 will be described with reference to FIGS. 1 to 4. As shown in FIG. 1, the digital still camera 10 generally comprises an image pickup system 1A, a signal processing system 10B, a memory 126, a mode designation unit 10E, and a system controller 12, which are interconnected as depicted.

The image pickup system 10A includes an imaging lens 102, a solid-state image pickup device 104, such as a charge-coupled device (CCD), an automatic focusing (AF) controller for automatic focus control, and an automatic exposure (AE) controller equipped with an iris mechanism, not shown. The imaging lens 102 is equipped with a shutter mechanism, not specifically shown. The automatic focus and exposure controllers are not shown in the figures. The imaging lens 102 is an optical system for focusing light from an object scene onto the photosensitive surface, or cell array, of the image pickup device 104. In the figures, elements not relevant to understanding the invention are not specifically shown and description thereon will not be made merely for simplicity.

The image pickup device 104 comprises photodiodes arranged in a two-dimensional array of rows and columns for converting light incident thereon to corresponding electrical signals to form the photosensitive surface. The image pickup device 104 has color filters, not specifically shown, positioned on a side of the photodiodes to which incident light impinges for separating the light incident thereon into color components. Each of the color separating filters corresponds to different one of the photodiodes and is formed integrally with the photodiode. The provision of the color separating filters allows incident light to be separated into the three primary colors, red (R), green (G) and blue (B), which will in turn enter the photodiodes.

The image pickup device 104 operates responsive to a drive signal output from a drive signal generator, not shown. Disposed between the photodiodes and a charge transfer device, i.e., vertical transfer device, adjacent the photodiodes are signal read gates, i.e., transfer gates, for reading out signal charges produced through photoelectric conversion from the light incident on the photodiodes.

When a field shift pulse is applied through the electrode to the signal read gate, the read gate transfers the signal charges from the photodiode to the vertical transfer path. The vertical transfer path sequentially transfers the signal charges read out from the respective photodiodes in a column direction, i.e., vertical direction, of the imaging frame. The vertical transfer path is composed of a charge coupled device. The vertical transfer causes each row of signal charges to move down to the next storage row so that the signal charges are finally supplied to a row shift register, i.e., horizontal transfer path. The horizontal transfer path operates in response to a drive signal to output the signal charges to the signal processing system 10B over a signal line 104a. In the description, signals are designated with reference numerals designating connections on which they are conveyed.

The automatic focus controller functions as being responsive to information obtainable from measurement of the distance, or range-finding, of an object to be shot from the camera 10 to control the focus control mechanism, not shown, to adjust the focal position of the imaging lens 102 to the optimum position for the object. In this case, the calculation of information obtainable from measurement of a distance and focal adjustment based on the information are carried out by the system controller 12. In response to a control signal from the system controller 12, the automatic focus controller drives the focus control mechanism to move the focal position of the imaging lens 102.

Further, the automatic exposure controller moves iris blades of the stop mechanism, not shown, in response to a control signal from the automatic exposure controller 108 provided within the system controller 12 and calculating the brightness of an object scene including an object so as to control the amount of incident light flux. Photo-metering is done using an imaging signal output from an offset corrector (OFFSET) 112, which will later be described. The automatic exposure controller 108 calculates the exposure value based on the measured brightness and supplies the automatic exposure control mechanism, not shown, with a control signal for controlling an stop value and a shutter speed to establish correct exposure for the exposure value. In response to the control signal, the automatic exposure control mechanism drives the stop mechanism and the shutter mechanism. This control helps in achieving the optimum exposure. Operation of the automatic exposure controller 108 will be described later.

The signal processing system 10B comprises an analog front end (AFE) circuit 110, the offset corrector 112, and a signal processor 114, which are interconnected as illustrated. For example, the analog front end circuit 110 serves as performing correlated double sampling (CDS) on an image signal generated from signal charges by the image sensor 104 and supplied therefrom over the line 104a in order to reduce noise, sampling the analog signal 104a, and quantizing the sampled signal into a corresponding digital signal, which is analog-to-digital (A/D) conversion. The digital signal resulting from the conversion is fed to the offset corrector 112 over a signal line 110a. The offset corrector 112 functions as subtracting the black level voltage from the signal 110a to produce an image signal which is supplied to the signal processor 114 and then to an S1 memory 116 of the system controller 12 over a line 112a.

The signal processor 114 performs automatic white balance (AWB) correction, gamma correction, edge compensation, etc., on the resulting signal. The signal processor 114 converts an imaging signal received from the image pickup device 104 to a recordable form of video signal. Then, the signal processor 114 outputs the video signal to the memory 126 over a line 114a.

Although not specifically shown, for example, the signal processor system 10B includes a drive signal generator adapted to generate a synchronous signal based on a clock signal generated by an oscillator to supply the signal to the constituent elements, such as the signal processor 114, included in the camera 10, over connections 108a and 108a. The drive signal generator further generates various timing signals, based on the synchronous signal. Such timing signals include those used for reading out the signal charge generated in the image pickup device 104, such as vertical and horizontal drive signals which define timings for driving the vertical and horizontal transfer paths, respectively, and drive shift signals for enabling field shift and line shift. Moreover, the signals from the drive signal generator are also used for controlling operations of the automatic focus and exposure mechanisms.

The mode setting section 10E includes a shutter release button 128 and an imaging-mode switch 130. In this embodiment, the shutter release button 128 is provided with a two-stroke button mechanism. Specifically, when the shutter release button 128 takes its half-depressed state (S1) as the first stroke, a photo-metering mode is set and a signal indicating the photo-metering mode thus set is supplied to the system control 12 over a line 128a. When the shutter release button 128 takes its fully-depressed state as the second stage, the signal defining the timing for taking a picture is supplied to the system control 12 over a line 128a to notify the system control 12 of fact the still picture shoot mode selected.

Further, the imaging-mode switch 130 may be a cross-shaped key for manually controlling by moving a cursor displayed on the display screen in the mode setting section 10E up and down and right and left in order to select items and pictures. The selected information is also sent to the system controller 12 over a line 130a. It may be contemplated that the imaging-mode switch 130 is adapted to set ISO sensitivity or speed to provide a signal indicative of the ISO sensitivity thus set to the system controller 12.

The system controller 12 serves to control the entire operation of the camera 10. The system controller 12 includes a central processing unit (CPU), not specifically shown. In response to a signal received from the imaging-mode switch 130, the system controller 12 determines which mode has been selected. Further, the system controller 12 performs control on the processing, etc., of an image signal based on information indicative of what the key switch 130 has selected. Based on the determination made on the basis of the information supplied by the key switch, the system controller 12 controls the operation of the drive signal generator.

In the photo-metering mode, the automatic exposure controller 108 in the system controller 12 retrieves from the S1 memory 116 over a line 116a an image signal fed from the offset corrector 112 and stored in the S1 memory unit 116. The automatic exposure controller 108 divides a photographing frame into 36 (6×6 in vertical and horizontal directions) sub-areas, integrates the brightness values for each sub-area and averages the brightness values to determine, based on the average brightness value, the brightness of the entire sub-areas in the photographing field. According to the brightness of the photographing field thus determined, the ISO sensitivity will be set.

The lower the brightness is, the higher the ISO sensitivity is set. Relationship between brightness and ISO sensitivity is given by the expression:

$$F \times F/t = B \times S/K = 2^{**}EV,$$

where F represents a stop value, t a shutter speed, B a brightness, S an ISO sensitivity, K constant, and EV an exposure value. The term "$2^{**}EV$" represents EV power of 2. For example, based on this expression, ISO sensitivity is set to the optimal value in a fashion to read below. The minimum value of the aperture stop is determined by the optical system of the camera 10. The shutter speed needs to be high enough so as not to create any motion blur, and taking into account this fact, the maximum value of the shutter speed is determined. Based on the minimum value of the stop and the maximum value of the shutter speed, the minimum value of the term "F×F/t" is determined. Since this minimum value and the expression "F×F/t=B×S/K" are given, determination of the brightness leads to determination of the ISO sensitivity.

Data representative of the ISO sensitivity corresponding to the brightness values of the photo-metering areas, in other words, relationship between the brightness and ISO sensitivity may be stored in advance in the memory, not shown, provided in the system controller 12. Further, when at least one of the stop value and shutter speed is set by the camera user, that value or values maybe used to determine the value of the term "F×F/t". Moreover, when the user specifically sets ISO sensitivity, that ISO sensitivity will be used.

The automatic exposure controller 108 then calculates the variance of the brightness of the 36 sub-areas and thereby determines if the contrast of an object scene is high or low. When the contrast of the scene is above a predetermined threshold, the controller 108 determines the photographic scene is against light. It is preferred that the predetermined threshold is stored in advance in the memory in the system controller 12.

Then, the automatic exposure controller 108 selects a photo-metering mode in conformity with an ISO sensitivity set in accordance with Table 1. When the ISO sensitivity is not higher than 200, the controller 108 selects the multiple photo-metering mode. When the ISO sensitivity is 400, the controller 108 selects a combination of the multiple and center-weighted photo-metering modes so that the exposure values in the multiple and center-weighted photo-metering modes are averaged. When the ISO sensitivity is not less than 800, the controller 108 selects the center-weighted photo-metering mode. How the exposure is determined in the multiple and center-weighted photo-metering modes has already been described.

TABLE 1

| ISO sensitivity | Photo-metering mode |
| --- | --- |
| 64 | multiple photo-metering |
| 100 | multiple photo-metering |
| 200 | multiple photo-metering |
| 400 | multiple + center-weighted photo-metering |
| 800 | center-weighted photo-metering |
| 1600 | center-weighted photo-metering |
| 3200 | center-weighted photo-metering |

The reason why it is preferred that the controller 108 selects a photo-metering mode so that the camera 10 automatically controls itself to an ISO sensitivity level as shown in the above table will be described with reference to FIG. 2. The ISO sensitivity made as high as ISO 400 means the darkness almost like twilight, in which a subject 20 such as a person is shot against a night scene 22. If the object scene includes a bright spot like a street lamp 24 and the camera is placed in the multiple photo-metering mode, then the automatic exposure control is affected by such a bright object so that the subject 20 will sometimes be underexposed. In order to overcome this problem, the photo-metering mode is controlled to gradually shift from the multiple to center-weighted photo-metering mode.

When the automatic exposure controller 108 determines, after having determined the exposure, a photographic scene in question is against light, it corrects the exposure determined as described above into one for capturing the object brighter. For example, the EV value is reduced by 0.5 or 1.0. Incidentally, it may not be critical to the invention to carry out the exposure correction.

Operation of the digital still camera 10 constructed as described above will be described with reference to the flow chart of FIG. 3. In operation, the digital still camera 10 measures the distance to an object in a scene to be captured and the brightness of the scene prior to actual photographing. When the user photographs an object scene, the user presses the shutter release button 128 to its half stroke to instruct the camera 10 to set the distance metering and photo-metering modes (step S10). In response to the signal 128a received from the shutter release button 128 and instructing the distance metering and photo-metering modes, the digital still camera 10 operates so that the array of photodiodes receives the incident light from the scene, converts the light to corresponding electric charge, and accumulates the charge as imagewise signal charge.

In order to read out the signal charge accumulated as described above from the individual photodiodes, a vertical synchronous signal is generated. In timed with the vertical synchronous signal, the vertical drive signal to be supplied to the vertical transfer paths and the vertical drive signal for the readout gates are generated. The vertical drive signal is inputted via the electrodes of the vertical transfer paths to the gates for enabling the signal charge to be read out.

In order to transfer the signal charge from the photodiodes to the corresponding vertical transfer paths, the transfer gate is enabled. After the signal charge is transferred to the corresponding vertical transfer paths, vertical drive signals are sequentially fed. The signal charge transferred to the vertical transfer paths is transferred to the horizontal transfer path. Each time a horizontal line of signal charge has been transferred to the horizontal transfer path, the charge is sequentially transferred along the horizontal transfer path. In this way, the signal charge is thus read out from all the photodiodes of the image pickup device 104 during a prescribed period of time.

The image signal thus formed by the image pickup system 10A is supplied to the signal processing system 10B in order for the camera 10 to switch to the distance metering mode under the control of the system controller 12. The signal processing system 10B performs processing as described above such as converting the supplied image signal to a digital image signal. The digital image signal, after converted and processed, is used as information on the distance of the camera 10 to the object and is supplied to the S1 memory 116 of the system controller 12. Using the signal read out, the system controller 12 executes automatic focus control (step S12).

In this case, to perform automatic focus control, only the color G component of the signals obtained by the photoelectric conversion in the image pickup device 104 of the image pickup system 10A is extracted. This is because the information on color G, occupying about 70% of the luminance information, is only sufficient for performing the automatic focus control. Further, the photometry for automatic focusing requires pixel information to be repeatedly read out until an appropriate value is determined. Thus, it is required to read out signal charge at a speed as high as possible. After completion of automatic focus control, automatic exposure control is performed in the preliminary pickup step. Information about all color components is necessary for performing the automatic exposure control and thus, the automatic exposure control uses all color components rather than the single color component.

The automatic exposure controller 108 uses the photo-metering information obtained in the preliminary pickup mode to set the ISO sensitivity as previously described (step S14). Next, the automatic exposure controller 108 determines whether a light source is positioned in front of or behind an object (step S16). Thereafter, the automatic exposure controller 108 is responsive to the set ISO sensitivity to select a photo-metering mode (step S18). The automatic exposure controller 108 calculates exposure in accordance with the selected photo-metering mode and corrects the calculated exposure depending on the result showing the light source of interest is positioned in front of or behind the object.

The system controller 12 generates the control signals 108a for automatic focus and exposure controls, and outputs the signals 108a to the automatic focus and exposure mechanisms of the image pickup system 10A, respectively. The automatic focus and exposure mechanisms are responsive to the signals 108a to operate themselves according to the supplied control signals 108a.

Afterwards, the user depresses the shutter release button 128 to its full-stroke (S2) at his or her desired timing (step S20). In the actual imaging mode, pixels of the image pickup system 10A capture the light coming from the object scene in the manner similar to the range-finding and photometry described above.

An image signal representing the captured image is supplied from the image pickup system 10A to the signal processor 114. As previously mentioned, the signal processor 114 performs the series of signal processing. Then, image data developed by the signal processor 114 is stored in the memory 126 (step S22).

According to the illustrative embodiment, even when a subject such as a person is photographed with the ISO sensitivity changed, the photographer is able to prevent the subject from being photographed with inappropriate exposure, for example, the subject from being shot as underexposed.

Next, a modification of the illustrative embodiment will be described with reference to FIGS. 4A, 4B and 4C. The modification is directed to the control such that, when the photographer photographs an object in the ISO Auto mode with the ISO sensitivity got higher, i.e., under darker light, the exposure is controlled so as to allot the weighting for divisional photometry predominantly to the central area of the photographing frame. In the modification also, the photographing frame is divided into 16 (4×4 in vertical and horizontal directions) sub-areas.

FIG. 4A shows how individual sub-areas are weighted when the ISO sensitivity is not higher than 200 and the photo-metering mode is set to the multiple photo-metering. FIGS. 4B and 4C show how individual sub-areas are weighted when the ISO sensitivity is 400 and not less than 800, respectively, and the photo-metering mode is set to the multiple photo-metering. As the ISO sensitivity is set to its higher value, the four central sub-areas 30 in the central area of the photographing frame are weighted more heavily than the twelve peripheral sub-areas 32 surrounding the central sub-areas 30.

The numerical values allotted to those sub-areas are relative in weighting specific for the corresponding sub-areas. The sum of the weighting factors assigned to the sub-areas is 16 for all examples shown in these figures. When the ISO sensitivity is not less than 800, the weighting factors of "0" are assigned for the peripheral sub-areas 32, meaning that not the peripheral sub-areas 32 but only the central sub-areas 30 are used for photo-metering. Also, according to the modification, even when a subject such as a person is photographed with the ISO sensitivity changed, the photographer is able to prevent the subject from being photographed with inappropriate exposure, for example, underexposed.

The entire disclosure of Japanese patent application No. 2006-82958 filed on Mar. 24, 2006, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What I claim is:

1. An image pickup apparatus with ISO (International Organization for Standardization) sensitivity setting variable, comprising:

a sensitivity setter for setting an ISO sensitivity; and an exposure controller for performing exposure control so that the exposure is determined based on brightness values of a first photometry area and a second photometry area different from the first photometry area of an imaging frame, said exposure controller controlling weighting factors of the first photometry area and the second photometry area so as to be variable during the exposure control;

said exposure controller controlling the exposure so that the weighting factors of the first photometry area and the second photometry area are controlled according to the ISO sensitivity set by said sensitivity setter.

2. The apparatus in accordance with claim 1, wherein the first photometry area is a central portion of the imaging frame.

3. The apparatus in accordance with claim 1, wherein the first photometry area includes at least a portion of a desired object to be imaged.

4. The apparatus in accordance with claim 1, wherein said exposure controller operates so that the first photometry area is weighted more heavily than the second photometry area as the ISO sensitivity set by said sensitivity setter gets higher.

5. The apparatus in accordance with claim 1, wherein said exposure controller determines whether or not a light source is positioned behind an object to be imaged, and if the light source is positioned behind the object, said exposure controller changes the exposure.

6. The apparatus in accordance with claim 1, wherein at least one of the first photometry area and the second photometry area includes a plurality of photometry sub-areas.

7. An image pickup method of setting an ISO (International Organization for Standardization) sensitivity variable, comprising the steps of:

setting an ISO sensitivity;

performing exposure control so that the exposure is determined based on brightness values of a first photometry area and a second photometry area different from the first photometry area of an imaging frame; and controlling weighting factors of the first photometry area and the second photometry area to be variable during the exposure control so that the weighting factors of the first photometry area and the second photometry area are varied according to the ISO sensitivity set.

* * * * *